US009330273B2

(12) United States Patent
Khetawat et al.

(10) Patent No.: US 9,330,273 B2
(45) Date of Patent: May 3, 2016

(54) SYSTEMS AND METHODS FOR INCREASING COMPLIANCE WITH DATA LOSS PREVENTION POLICIES

(71) Applicant: Symantec Corporation, Mountain View, CA (US)

(72) Inventors: Rupesh Hanumant Khetawat, Kothrud (IN); Amol Sharadchandra Ghatge, Katraj (IN); Sagar Shashikant Sonawane, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/268,157

(22) Filed: May 2, 2014

(65) Prior Publication Data
US 2015/0269386 A1 Sep. 24, 2015

(30) Foreign Application Priority Data
Mar. 19, 2014 (IN) .............................. 343/KOL/2014

(51) Int. Cl.
*H04L 29/06* (2006.01)
*G06F 21/62* (2013.01)
(52) U.S. Cl.
CPC ..................................... *G06F 21/62* (2013.01)
(58) Field of Classification Search
CPC ........................................................ G06F 21/62
USPC ................................................................ 726/1
See application file for complete search history.

(56) References Cited

U.S. PATENT DOCUMENTS

| 4,926,476 | A  | * | 5/1990  | Covey ................. | G06F 21/6218 |
|           |    |   |         |                        | 711/163      |
| 7,159,239 | B2 | * | 1/2007  | Johnson ............. | G01N 33/5438 |
|           |    |   |         |                        | 713/168      |
| 8,332,947 | B1 | * | 12/2012 | Bregman .............. | G06F 21/577  |
|           |    |   |         |                        | 726/25       |
| 8,495,660 | B1 | * | 7/2013  | Hernacki ............... | H04L 51/08   |
|           |    |   |         |                        | 719/313      |
| 2003/0115458 | A1 | * | 6/2003  | Song ...................... | G06F 21/54 |
|           |    |   |         |                        | 713/165      |
| 2004/0068662 | A1 | * | 4/2004  | Ho ........................ | G06F 21/564 |
|           |    |   |         |                        | 726/24       |
| 2004/0148281 | A1 | * | 7/2004  | Bates ..................... | G06F 21/562 |
| 2005/0120239 | A1 | * | 6/2005  | Monroe .................. | G06F 21/64  |
|           |    |   |         |                        | 726/4       |
| 2006/0101514 | A1 | * | 5/2006  | Milener ............ | G06F 17/30902 |
|           |    |   |         |                        | 726/22      |
| 2007/0174913 | A1 | * | 7/2007  | Kuroda .................. | G06F 21/563 |
|           |    |   |         |                        | 726/24      |
| 2008/0047007 | A1 | * | 2/2008  | Satkunanathan ..... | H04L 12/585 |
|           |    |   |         |                        | 726/22      |
| 2008/0060086 | A1 | * | 3/2008  | Bhansali ............... | G06F 21/572 |
|           |    |   |         |                        | 726/35      |
| 2008/0189380 | A1 | * | 8/2008  | Bosworth .............. | H04L 67/22  |
|           |    |   |         |                        | 709/207     |
| 2008/0301754 | A1 | * | 12/2008 | Furuichi ................. | G06F 21/62  |
|           |    |   |         |                        | 726/1       |
| 2009/0119681 | A1 | * | 5/2009  | Bhogal .................. | G06F 21/554 |
|           |    |   |         |                        | 719/318     |
| 2010/0024020 | A1 | * | 1/2010  | Baugher ............. | G06F 21/6245 |
|           |    |   |         |                        | 726/7       |
| 2010/0241875 | A1 | * | 9/2010  | Ishii ........................ | G06F 3/062  |
|           |    |   |         |                        | 713/193     |
| 2011/0040980 | A1 | * | 2/2011  | Kerr ..................... | G06F 21/6245 |
|           |    |   |         |                        | 713/189     |
| 2011/0072520 | A1 | * | 3/2011  | Bhansali ............... | G06F 21/572 |
|           |    |   |         |                        | 726/27      |
| 2011/0283358 | A1 | * | 11/2011 | Cochin .................. | G06F 21/554 |
|           |    |   |         |                        | 726/23      |
| 2011/0302655 | A1 | * | 12/2011 | Tikkanen .............. | G06F 21/562 |
|           |    |   |         |                        | 726/24      |
| 2014/0068706 | A1 | * | 3/2014  | Aissi ....................... | G06F 21/60  |
|           |    |   |         |                        | 726/1       |
| 2014/0150106 | A1 | * | 5/2014  | Butler ..................... | G06F 21/51  |
|           |    |   |         |                        | 726/24      |

OTHER PUBLICATIONS

"What's new in Outlook 2013", https://support.office.com/en-US/Article/What-s-new-in-Outlook-2013-325ffe56-7b07-4ee7-8e64-b38bbbe4731c?ui=enUS&rs=en-US&ad=US, as accessed Feb. 12, 2014, Office Online, Microsoft, (on or before Feb. 12, 2014).

* cited by examiner

*Primary Examiner* — Michael S McNally
(74) *Attorney, Agent, or Firm* — ALG Intellectual Property, LLC

(57) ABSTRACT

A computer-implemented method for increasing compliance with data loss prevention policies may include (1) identifying a file that is subject to a data loss prevention policy, (2) determining a classification of the file according to the data loss prevention policy, (3) identifying a graphical user interface that is configured to display a representation of the file, and (4) enhancing the representation of the file within the graphical user interface with a visual indication of the classification of the file according to the data loss prevention policy. Various other methods, systems, and computer-readable media are also disclosed.

20 Claims, 8 Drawing Sheets

SYSTEMS AND METHODS FOR INCREASING COMPLIANCE WITH DATA LOSS PREVENTION POLICIES

BACKGROUND

Protecting sensitive data is important for any organization's reputation, finances, and future. In an increasingly networked era full of ever more portable data storage devices, preventing the exposure of sensitive data to non-employees is more complicated and difficult than ever before. Many organizations have developed data loss prevention (DLP) policies in order to combat the loss of data. DLP policies may include rules intended to govern the behavior of both employees and computing systems to reduce the risk of sensitive data being handled in insecure ways.

Traditional systems for increasing compliance with DLP policies may rely on employees to read and remember details from extensive policy handbooks. This may cause well-intentioned employees to accidentally commit data breaches by forgetting DLP policy instructions and/or mistakenly classifying sensitive data as non-sensitive. Traditional systems for enforcing DLP policies may also be unable to distinguish between accidental and malicious offenders, and thus may risk punishing accidental offenders too severely and/or malicious offenders insufficiently. Accordingly, the instant disclosure identifies and addresses a need for additional and improved systems and methods for increasing compliance with data loss prevention policies.

SUMMARY

As will be described in greater detail below, the instant disclosure generally relates to systems and methods for increasing compliance with data loss prevention policies by enhancing visual representations of files with indicators of the files' classifications according to DLP policies.

In one example, a computer-implemented method for increasing compliance with data loss prevention policies may include (1) identifying a file that is subject to a data loss prevention policy, (2) determining a classification of the file according to the data loss prevention policy, (3) identifying a graphical user interface that is configured to display a representation of the file, and (4) enhancing the representation of the file within the graphical user interface with a visual indication of the classification of the file according to the data loss prevention policy.

In some examples, enhancing the representation of the file with the visual indication may be in response to detecting an attempt to copy the file to a destination that violates the data loss prevention policy.

In some embodiments, users may be informed about modifications to the data loss prevention policy in any or all of a variety of ways. In one embodiment, the computer-implemented method may further include (1) detecting a modification of the data loss prevention policy, where the data loss prevention policy applies to a network and (2) displaying, on at least one computing device connected to the network, a notification designed to educate users about the modification of the data loss prevention policy. In one example, the notification may include (1) a modification to a login screen, (2) a modification to a lock screen, (3) a modification to a wallpaper, (4) a popup notification, and/or (5) a modification to a screensaver. In one embodiment, the notification may be based at least in part on information provided by an administrator to be displayed to users about the modification to the data loss prevention policy. In some examples, the computer-implemented method may further include adding a tooltip to the representation of the file that displays information about the data loss prevention policy in response to a mouseover action.

In one embodiment, the visual indication of the classification of the file according to the data loss prevention policy may include (1) a visual overlay on the representation of the file, (2) a border around the representation of the file, (3) a tinting of the representation of the file, and/or (4) a tag on the representation of the file.

In some embodiments, users who have previously violated the data loss prevention policy may be informed of potential violations they may be about to undertake. In one embodiment, the computer-implemented method may further include detecting a potential data transfer action initiated by a user and displaying a notification to the user that is designed to educate the user about a data loss risk caused by the potential data transfer action in response to detecting the potential data transfer action.

In some examples, the computer-implemented method may further include (1) determining that the user has previously committed a violation of the data loss prevention policy, (2) determining that the violation of the data loss prevention policy was committed via a type of data transfer action that matches the type of the potential data transfer action, and (3) basing content within the notification to the user on the type of the potential data transfer action. In some examples, displaying the notification to the user is in response to determining that the user has met a predetermined threshold for previous violations of the data loss prevention policy.

The potential data transfer action may include any of a variety of actions. In one example, the potential data transfer action may include the user opening an email application and the notification may include a warning including content about a previous violation of the data loss prevention policy committed by the user via email. In another example, the potential data transfer action may include the user connecting a storage device to device that may include sensitive data and the notification may include a warning including content about a previous violation of the data loss prevention policy committed by the user via connecting a storage device to a device that may include sensitive data. Additionally or alternatively, the potential data transfer action may include the user starting a file transfer session and the notification may include a warning including content about a previous violation of the data loss prevention policy committed by the user via file transfer.

In one embodiment, a system for implementing the above-described method may include (1) a file identification module, stored in memory, that identifies a file that is subject to a data loss prevention policy, (2) a determination module, stored in memory, that determines a classification of the file according to the data loss prevention policy, (3) an interface identification module, stored in memory, that identifies a graphical user interface that is configured to display a representation of the file, (4) an enhancement module, stored in memory, that enhances the representation of the file within the graphical user interface with a visual indication of the classification of the file according to the data loss prevention policy, and (5) at least one physical processor configured to execute the file identification module, the determination module, the interface identification module, and the enhancement module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file that is subject to a data loss prevention policy, (2) determine a classification of the file according to the data loss prevention policy, (3) identify a graphical user interface that is configured to display a representation of the file, and (4) enhance the representation of the file within the graphical user interface with a visual indication of the classification of the file according to the data loss prevention policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
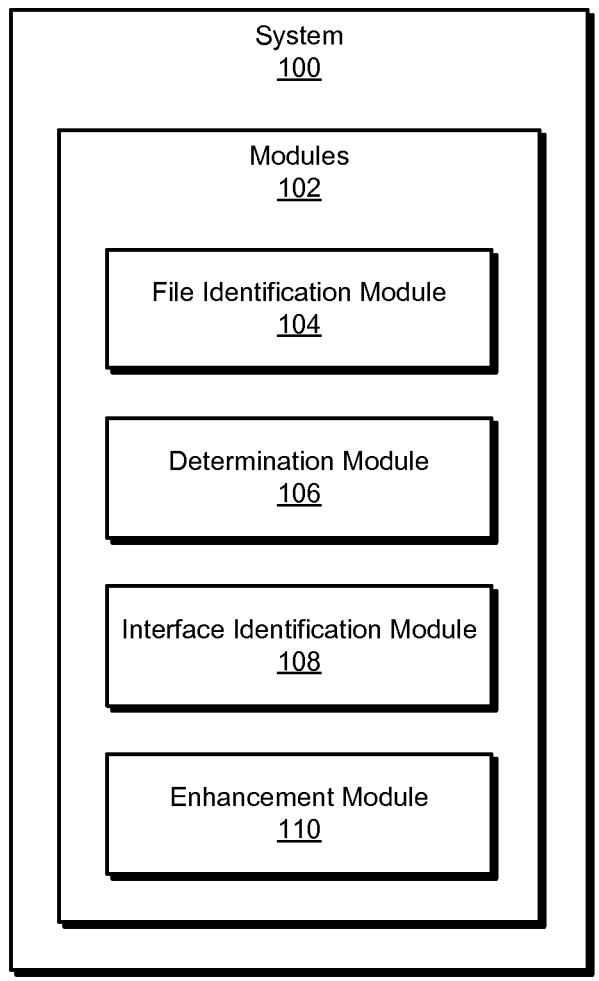
FIG. 1 is a block diagram of an exemplary system for increasing compliance with data loss prevention policies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for increasing compliance with data loss prevention policies. As will be explained in greater detail below, by enhancing file icons with indications of files' DLP status, users may be reminded of the DLP policy during the course of normal usage of computing devices and may be prevented from accidentally violating the DLP policy. In addition, regularly displaying information about the DLP policy to users may increase general user knowledge of DLP policies and further reduce accidental violations. Finally, warning repeat offenders by displaying warnings when they may be about to commit further DLP policy violations may both reduce DLP policy violations and more clearly distinguish between malicious and accidental offenders.

Figure 2:
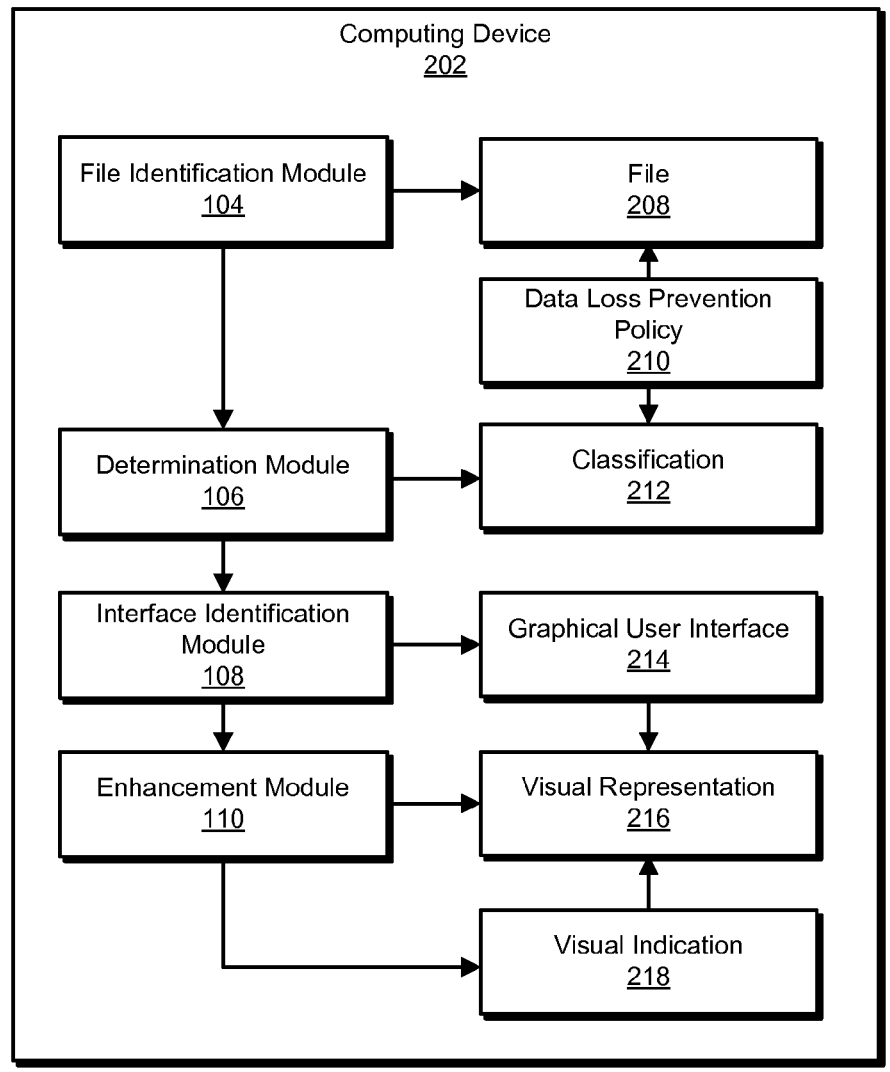
FIG. 2 is a block diagram of an additional exemplary system for increasing compliance with data loss prevention policies.
Figure 5:
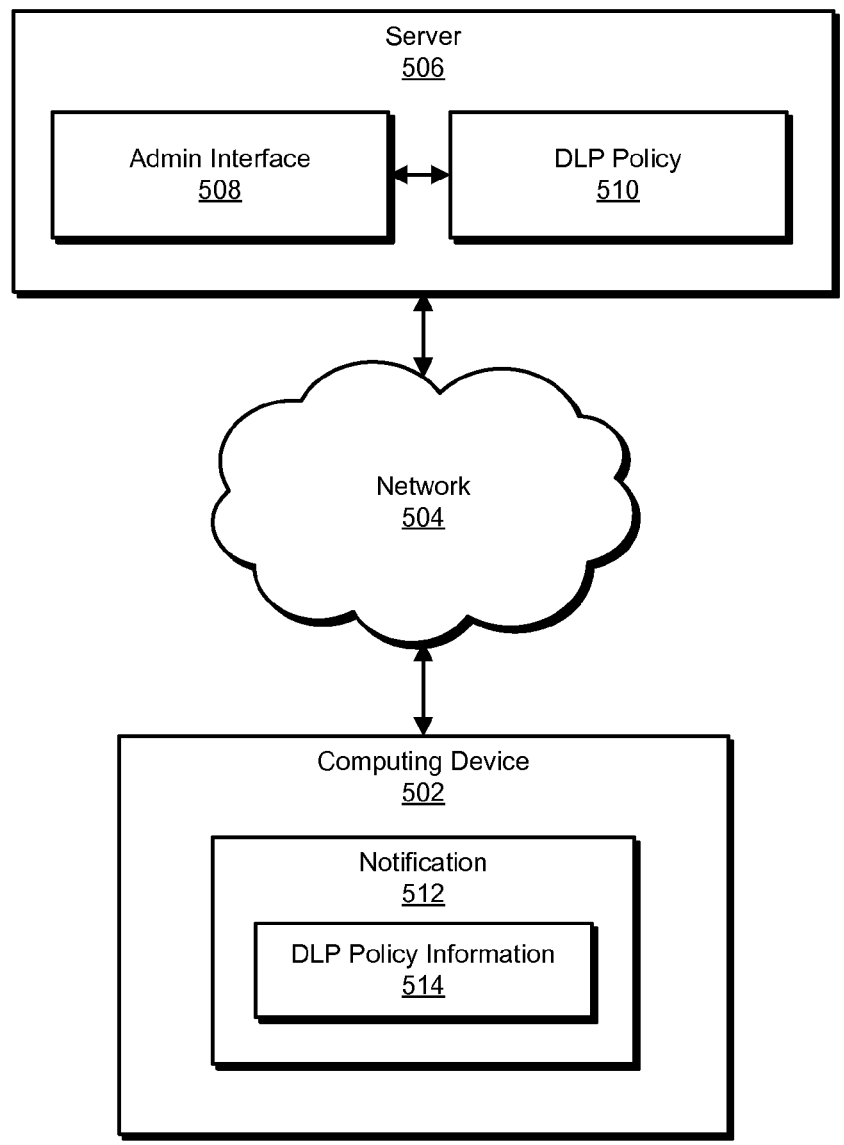
FIG. 5 is a block diagram of an exemplary computing system for increasing compliance with data loss prevention policies.
Figure 6:
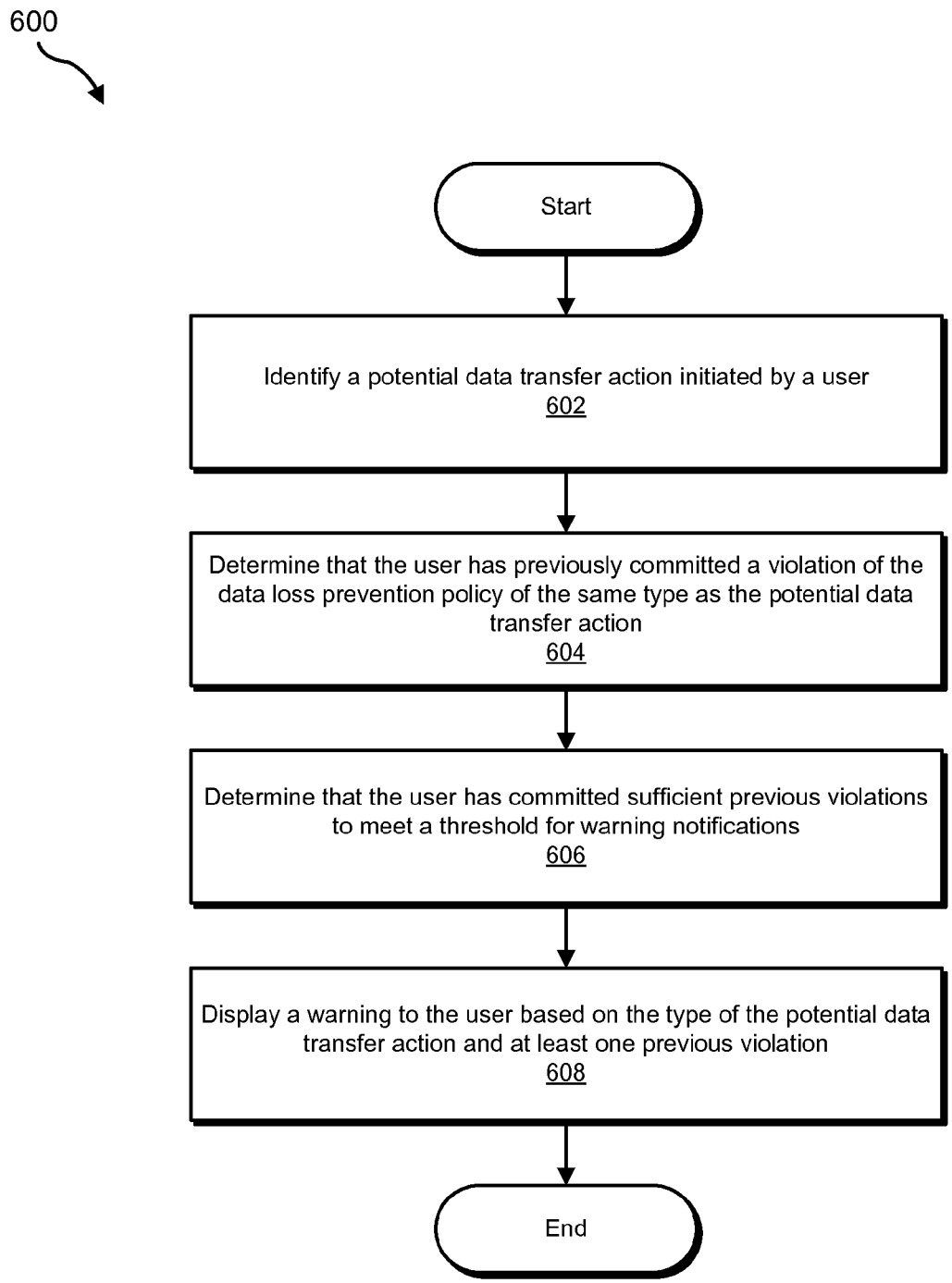
FIG. 6 is a block diagram of an exemplary computing system for increasing compliance with data loss prevention policies.

The following will provide, with reference to FIGS. 1, 2, and 6, detailed descriptions of exemplary systems for increasing compliance with data loss prevention policies. Detailed descriptions of corresponding computer-implemented methods will also be provided in connection with FIGS. 3 and 5. Detailed descriptions of a graphical user interface for increasing compliance with data loss prevention policies will be provided in connection with FIG. 4. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for increasing compliance with data loss prevention policies. As illustrated in this figure, exemplary system 100 may include one or more modules 102 for performing one or more tasks. For example, and as will be explained in greater detail below, exemplary system 100 may include a file identification module 104 that may identify a file that may be subject to a data loss prevention policy. Exemplary system 100 may additionally include a determination module 106 that may determine a classification of the file according to the data loss prevention policy. Exemplary system 100 may also include an interface identification module 108 that may identify a graphical user interface that may be configured to display a representation of the file. Exemplary system 100 may additionally include an enhancement module 110 that may enhance the representation of the file within the graphical user interface with a visual indication of the classification of the file according to the data loss prevention policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. In one example, computing device 202 may be programmed with one or more of modules 102.

In one embodiment, one or more of modules 102 from FIG. 1 may, when executed by at least one processor of computing device 202, enable computing device 202 to increase compliance with data loss prevention policies. For example, and as will be described in greater detail below, one or more of modules 102 may cause computing device 202 to increase compliance with data loss prevention policies. For example, and as will be described in greater detail below, file identification module 104 may identify a file 208 that is subject to a data loss prevention policy 210. Once file 208 has been identified, determination module 106 may determine a classification 212 of file 208 according to data loss prevention policy 210. Next, interface identification module 108 may identify a graphical user interface 214 that is configured to display a visual representation 216 of file 208. Finally, enhancement module 110 may enhance visual representation 216 of file 208 within graphical user interface 214 with a visual indication 218 of classification 212 of file 208 according to data loss prevention policy 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Figure 3:
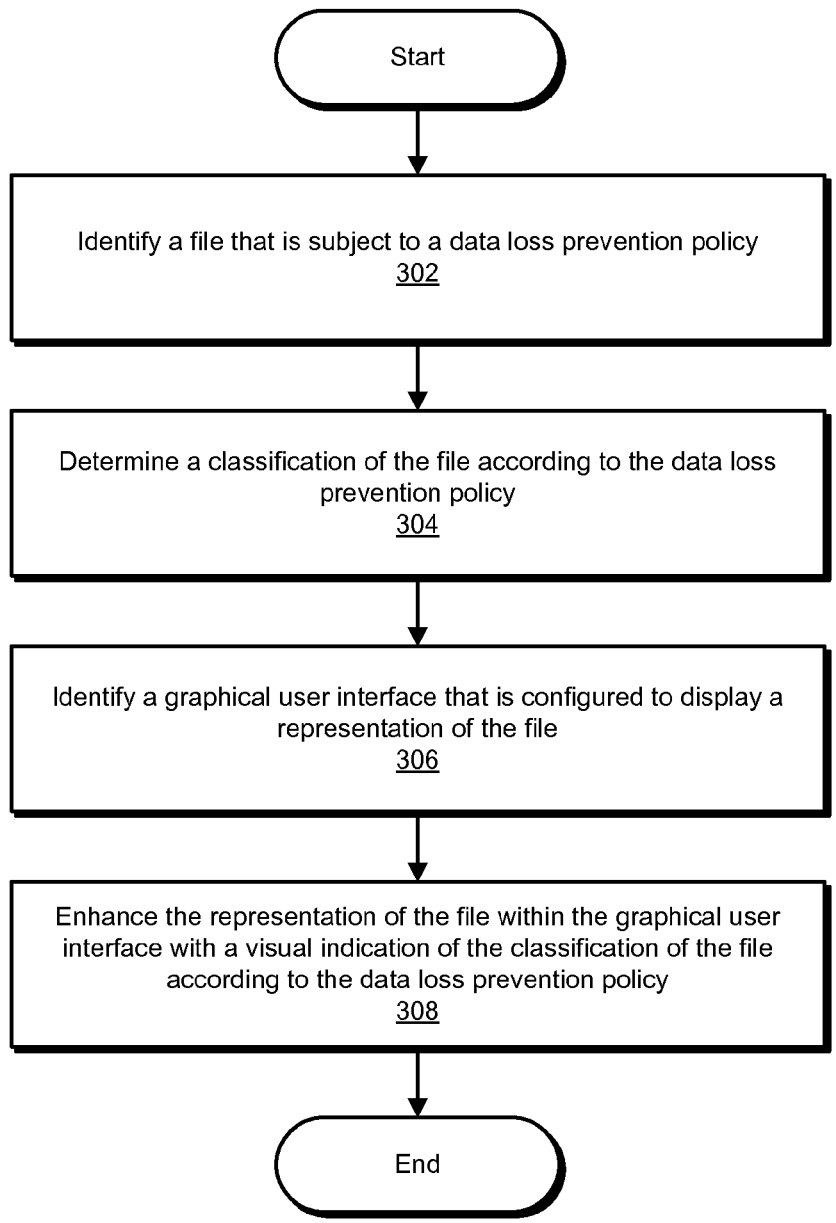
FIG. 3 is a flow diagram of an exemplary method for increasing compliance with data loss prevention policies.

FIG. 3 is a flow diagram of an exemplary computer-implemented method 300 for increasing compliance with data loss prevention policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a file that is subject to a data loss prevention policy. For example, at step 302 file 208 identification 104 may, as part of computing device 202 in FIG. 2, identify file 208 that is subject to data loss prevention policy 210.

The phrase "data loss prevention policy," as used herein, generally refers to any set of rules and/or instructions designed to reduce the risk of data loss. For example, an organization may create a data loss prevention policy to prevent sensitive data from being accessible to people outside the organization. A data loss prevention policy may include rules for employees to follow and/or computing instructions, such as scripts and/or applications, that secure prevent computing devices against data loss. For example, a data loss prevention policy may include a rule that sensitive data is not allowed to be copied to external storage devices, sent via email, and/or uploaded to file transfer services. In some examples, DLP policies may include rules regulating data at rest (i.e. in storage), data in motion (i.e. traveling over a network), and/or data in use.

File identification module 104 may identify the file that is subject to the DLP policy in a variety of ways and contexts. For example, file identification module 104 may identify the file as part of a scan of files performed by DLP software. In one example, file identification module 104 may identify the file during the initial set-up scan performed by a piece of newly installed DLP software. In another example, file identification module 104 may identify the file during a regularly scheduled scan by a DLP application. Additionally or alternatively, file identification module 104 may identify the file when the file is created, copied, and/or modified.

At step 304 one or more of the systems described herein may determine a classification of the file according to the data loss prevention policy. For example, at step 304 determination module 106 may, as part of computing device 202 in FIG. 2, determine classification 212 of file 208 according to data loss prevention policy 210.

The term "classification," as used herein, generally refers to any categorization and/or description of a file based at least in part on a DLP policy. A classification may categorize the file in a variety of ways. In some examples, a file may be categorized as either sensitive or non-sensitive. In other examples, a file may fall into any or all of several categories such as personally identifying information, financial data, credit card information, confidential information, and/or classified information. In some examples, a classification may be based on which actions on a file are allowable according to the DLP policy. For example, classifications for files may include restrictions on where or how a file may be stored, where or how a file may be transferred, where or how the contents of a file may be output to a peripheral device (e.g., a printer), whether contents of a file may be copied to a clipboard service, etc.

Determination module 106 may determine the classification for the file in any or all of a variety of ways and contexts. For example, determination module 106 may determine the classification of the file as part of a scan by a DLP application. In another example, determination module 106 may determine the classification for the file based on the results of a previous DLP evaluation. For example, determination module 106 may determine that the file includes sensitive data based on a previous evaluation by a DLP application having tagged the file as sensitive.

At step 306 one or more of the systems described herein may identify a graphical user interface that is configured to display a representation of the file. For example, at step 306 interface identification 108 may, as part of computing device 202 in FIG. 2, identify graphical user interface 214 that is configured to display visual representation 216 of file 208.

The phrase "graphical user interface" (or "GUI") as used herein, generally refers to any interface that allows a user to interact with a computing device via visual indicators. For example, the graphical user interface may include a window manager and/or a desktop environment. Additionally or alternatively, the graphical user interface may include one or more interactive elements presented by a window manager and/or a desktop environment. In some examples, a GUI may allow a user to interact with a computing device by clicking on icons. Examples of GUIs include, without limitation, windows, file system browsers, and desktops.

Interface identification module 108 may identify the GUI in a variety of ways and contexts. For example, interface identification module 108 may identify that a GUI has just been launched by a user. In one example, interface identification module 108 may identify that a user has just launched a file browser, such as WINDOWS EXPLORER or MAC FINDER. In some embodiments, interface identification module 108 may operate within the file browser and/or as an extension of the file browser. Additionally or alternatively, interface identification module 108 may tag sensitive files and/or may configure the file browser to display the tags as enhancements of representations of sensitive files.

The term "representation," as used herein, generally refers to any visual element that is derived from, based on, linked to, and/or in reference to a file. For example, a representation of the file may appear in a file browser. In one example, a representation of the file may include an icon. In another example, a representation of the file may include a listing of the file.

At step 308 one or more of the systems described herein may enhance the representation of the file within the graphical user interface with a visual indication of the classification of the file according to the data loss prevention policy. For example, at step 308 enhancement module 110 may, as part of computing device 202 in FIG. 2, enhance visual representation 216 of file 208 within graphical user interface 214 with visual indication 218 of classification 212 of file 208 according to data loss prevention policy 210.

Enhancement module 110 may enhance the representation of the file in any of a variety of ways. For example, enhancement module 110 may change the appearance of an icon representing the file to indicate that the file is subject to the DLP policy.

The phrase "visual indication," as used herein, generally refers to any modification to a representation of a file. For example, a visual indication may indicate the classification of a file according to a DLP policy. In some examples, the visual indication of the classification of the file according to the data loss prevention policy may include at least one of (1) a visual overlay on the representation of the file, (2) a border around the representation of the file, (3) a tinting of the representation of the file, and/or (4) a tag on the representation of the file. For example, the visual indication may include a red dot on the corner of the icon to indicate the file is highly sensitive, a yellow dot to indicate the file is moderately sensitive, and a green dot to indicate that the file is not at all sensitive according to the DLP policy. In another example, an icon representing the file may be tinted red to indicate that the file is sensitive. Additionally or alternatively, a file may be surrounded with a dotted red border to indicate that the file is sensitive. In some embodiments, the visual indication may include a label that may enhance a text representation of the file. For example, the file name may be highlighted in a color that indicates the DLP policy classification of the file.

Figure 4:
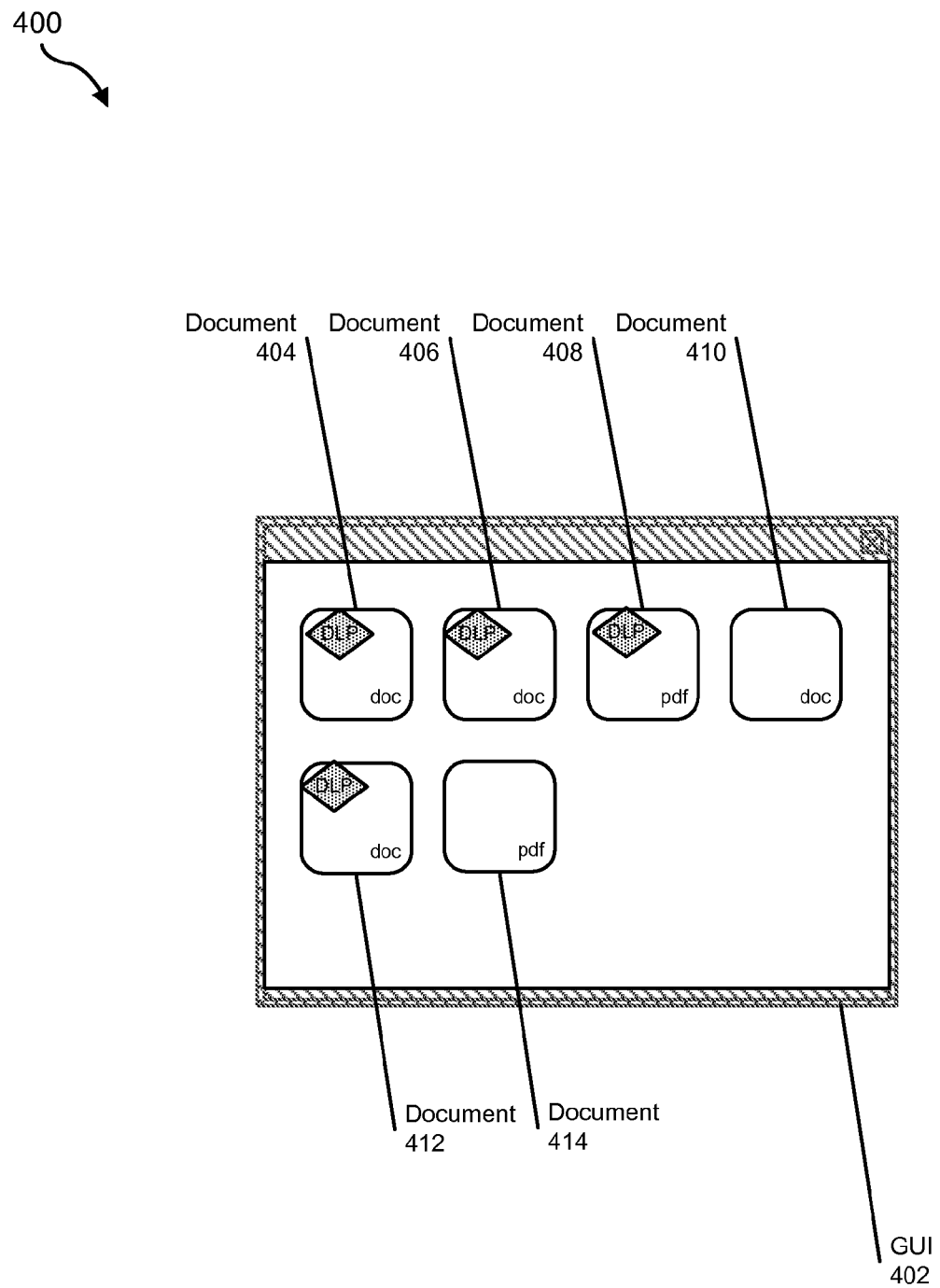
FIG. 4 is a block diagram of an exemplary graphical user interface for increasing compliance with data loss prevention policies.

In one example, the text "DLP" may be added to an icon to indicate that the file is subject to the DLP policy. FIG. 4 is a block diagram of an exemplary computing system 400 for increasing compliance with data loss prevention policies by adding visual indications to icons. GUI 402 may include a file browser that may display representations of documents 404, 406, 408, 410, 412 and/or 414. Documents 404, 406, 408 and/or 412 may be classified as sensitive according to the DLP policy and/or may include a visual indication such as the text "DLP" in a colored diamond on the corner of the icon.

In some examples, enhancement module 110 may add a tooltip to the representation of the file that displays information about the data loss prevention policy in response to a mouseover action. The information about the data loss prevention policy may include a classification of the file, a tag on the file, instructions about what actions are permissible in regards to the file, and/or a history of the file. For example, a tooltip may include the text, "Sensitive file. Do not copy to USB or email. Internal networks only."

In some examples, enhancement module 110 may enhance the representation of the file with the visual indication in response to detecting an attempt to copy the file to a destination that violates the data loss prevention policy. For example, a user may open a program used to transfer files from one device to another such as an email application, a file transfer program, or a file browser pointing to an external storage device. In one example, a user may plug in a universal services bus storage (USB) drive and enhancement module 110 may enhance icons representing sensitive documents with a red outline to indicate that the documents include sensitive data and should not be copied to the USB drive.

In one embodiment, systems described herein may detect a modification of the data loss prevention policy (where the data loss prevention policy applies to a network) and may display, on at least one computing device connected to the network, a notification designed to educate users about the modification of the data loss prevention policy. In one embodiment, the notification may be based at least in part on information provided by an administrator to be displayed to users about the modification to the data loss prevention policy. FIG. 5 is a block diagram of an exemplary computing system 500 for increasing compliance with data loss prevention policies by displaying notifications about DLP policies to users. As illustrated in FIG. 5, server 506 may include admin interface 508 and/or DLP policy 510. Server 506 may be connected to computing device 502 via network 504. Computing device 502 may be configured to display notification 514 that includes DLP policy information 514. In some embodiments, an administrator may enter DLP policy information 514 via admin interface 508. For example, admin interface 508 may include various fields for editing DLP policy 510 including fields for entering a human-readable description of each policy rule. An administrator may enter a human-readable description of a rule that is being added and/or modified and the description may be displayed to users as a notification.

In one embodiment, the notification may include (1) a modification to a login screen including information about the modification of the data loss prevention policy, (2) a modification to a lock screen including information about the modification of the data loss prevention policy, (3) a modification to a wallpaper including information about the modification of the data loss prevention policy, (4) a popup notification including information about the modification of the data loss prevention policy, and/or (5) a modification to a screensaver including information about the modification of the data loss prevention policy. For example, text on a login screen, lock screen, screensaver and/or wallpaper may describe the modification to the DLP policy. In one example, a "tip of the day" popup notification may display selected information from the DLP policy at every login. In some examples, the information may be selected randomly, manually by an administrator, by weighting the sections of information deemed most important by an administrator, by weighting which portions of the policy have been violated most frequently and/or recently, based on which policies have been most recently modified, and/or based on the user and/or department to which the notification will be displayed.

In one embodiment, systems described herein may detect a potential data transfer action initiated by a user and display a notification to the user that is designed to educate the user about a data loss risk caused by the potential data transfer action in response to detecting the potential data transfer action. For example, a user may attach a sensitive file to an email using a web mail client and a notification may pop up informing the user of how many sensitive files are leaked annually due to email.

The term "notification," as used herein, may refer to any information displayed to a user. Notifications may appear in any of a variety of contexts and/or formats. In some examples, notifications may appear inside an application such as a file browser, while in other examples, notifications may appear in independent windows, such as pop-up notifications. Formats for notifications may include, without limitation, plain text, formatted text, images, audio, video, and/or animations.

The phrase "potential data transfer action," as used herein, generally refers to any action undertaken on a computing system that may cause data to be transferred to another computing system and/or profile within the computing device. Examples of potential data transfer actions include sending emails, using file transfer applications, uploading files to servers, connecting external storage devices, copying files to other computing systems, and/or copying files between profiles and/or sandboxes on one computing system.

In some examples, systems described herein may display the notification to the user in response to determining that the user has met a predetermined threshold for previous violations of the data loss prevention policy. In some embodiments, systems described herein may compare the total of previous violations committed by the user to the predetermined threshold. In other embodiments, previous policy violations may expire after a certain time and only violations committed within a certain time threshold may be considered. Additionally or alternatively, systems described herein may weight violations of varying types and/or severity differently when calculating whether the user has met the predetermined threshold for previous violations of the DLP policy. In some embodiments, different types of violations may have different predetermined thresholds for violations. For example, a user may be warned after emailing sensitive documents five or more times but may be warned about connecting unapproved external storage devices after only the second incident.

In some embodiments, systems described herein may check for previous violations and/or compare to a threshold of previous violations before displaying a warning. FIG. 6 is a flow diagram of an exemplary method 600 for increasing compliance with data loss prevention policies by warning repeat offenders. As illustrated in FIG. 6, at step 602 systems described herein may identify a potential data transfer action initiated by the user. For example, a user may have a file browser open to sensitive data and another file browser open to a USB drive and may be attempting to drag an icon representing a sensitive file from the former to the latter. At step 604, systems described herein may determine that the user has previously committed a violation of the data loss prevention policy of the same type as the potential data transfer action. For example, the user may have previously copied sensitive data to a tablet. At step 606, systems described herein may determine that the user has committed sufficient previous violations to meet a threshold for warning notifications to be displayed. For example, the user may have copied sensitive data to external storage devices five times previously. In some embodiments, step 604 may be performed as part of step 606. At step 608, systems described herein may display a warning to the user based on the type of the potential data transfer action and at least one previous violation. For example, the user may be presented with an animation quoting the DLP policy rules on transferring data to external devices and describing the previous violations committed by the user with external devices.

In one embodiment, systems described herein may include (1) determining that the user has previously committed a violation of the data loss prevention policy, (2) determining that the violation of the data loss prevention policy was committed via a type of data transfer action that matches the type of the potential data transfer action, and (3) basing content within the notification to the user on the type of the potential data transfer action. In some examples, the type of the potential data transfer action may be an exact match; for example, a user may have previously added a sensitive file as an email attachment and may be currently attempting to add a sensitive file as an email attachment. In other examples, the type of potential data transfer action may not be an exact match. For example, a user may have previously copied a sensitive file to a smartphone and may currently be attempting to copy the file to an external hard drive.

In one example, the potential data transfer action may include the user opening an email application and the notification may include a warning including content about a previous violation of the data loss prevention policy committed by the user via email. For example, a user may open an email program such as OUTLOOK and/or may attach a sensitive file to an email, causing a warning animation to play describing a previous incident where the user emailed a sensitive document. In some examples, the user may be warned as soon as an email application is launched.

In another example, the potential data transfer action may include the user connecting a storage device to device that may host sensitive data and the notification may include a warning that may have content about a previous violation of the DLP policy committed by the user. In this example, the previous violation of the DLP policy committed by the user may include connecting a storage device to a device that may host sensitive data. For example, a user may plug in a USB drive to a desktop computer that includes sensitive files and a warning notification may pop up listing several previous incidents where the user has copied sensitive files to external storage devices. In some embodiments, the user may be warned as soon as the external device is connected. In some embodiments, the user may only be warned after attempting to copy sensitive files to the external device.

Additionally or alternatively, the potential data transfer action may include the user starting a file transfer session and the notification may include a warning including content about a previous violation of the data loss prevention policy committed by the user via file transfer. For example, a user may attempt to copy a file from a secure device to an insecure device via a command line interface and warning text may appear on the command line interface with detailed data about all previous file transfers by the user that violated the DLP policy.

As explained above in connection with method 300 in FIG. 3, by displaying reminders of DLP policies during a user's regular actions, systems described herein may increase user awareness of and compliance with DLP policies and thus may reduce the loss of sensitive data. Systems described herein may accomplish this in several ways.

Systems described herein may identify sensitive files and may add visual indicators to representations of those files. Users viewing the sensitive files in a GUI may be reminded of the DLP policy and made aware that the files include sensitive data, reducing the chances that users will accidentally handle the files in insecure ways. Users who handle clearly marked sensitive files in ways that violate the DLP policy are more likely to be malicious offenders.

Systems described herein may also display notifications to users about DLP policies, both during the course of normal activity and when potential data transfer actions are detected. Users who see information about the DLP policy and DLP policy changes on login screens and wallpapers are more likely to be informed about current DLP policies and less likely to accidentally violate them. Repeat offenders who are warned with tailored notifications when a potential violation is likely to occur are less likely to re-offend, and easier to classify as malicious offenders if DLP policy violations continue in spite of the warnings.

Increasing DLP policy compliance by increasing user education may also reduce the need for draconian DLP enforcement measures in other channels, such as monitoring users' use of applications and/or blocking users' abilities to transfer files. By keeping users informed of DLP policies and which files the policies apply to and warning repeat offenders, systems described herein may increase compliance with DLP policies in effective and non-invasive ways, improving user experience and data security.

Figure 7:
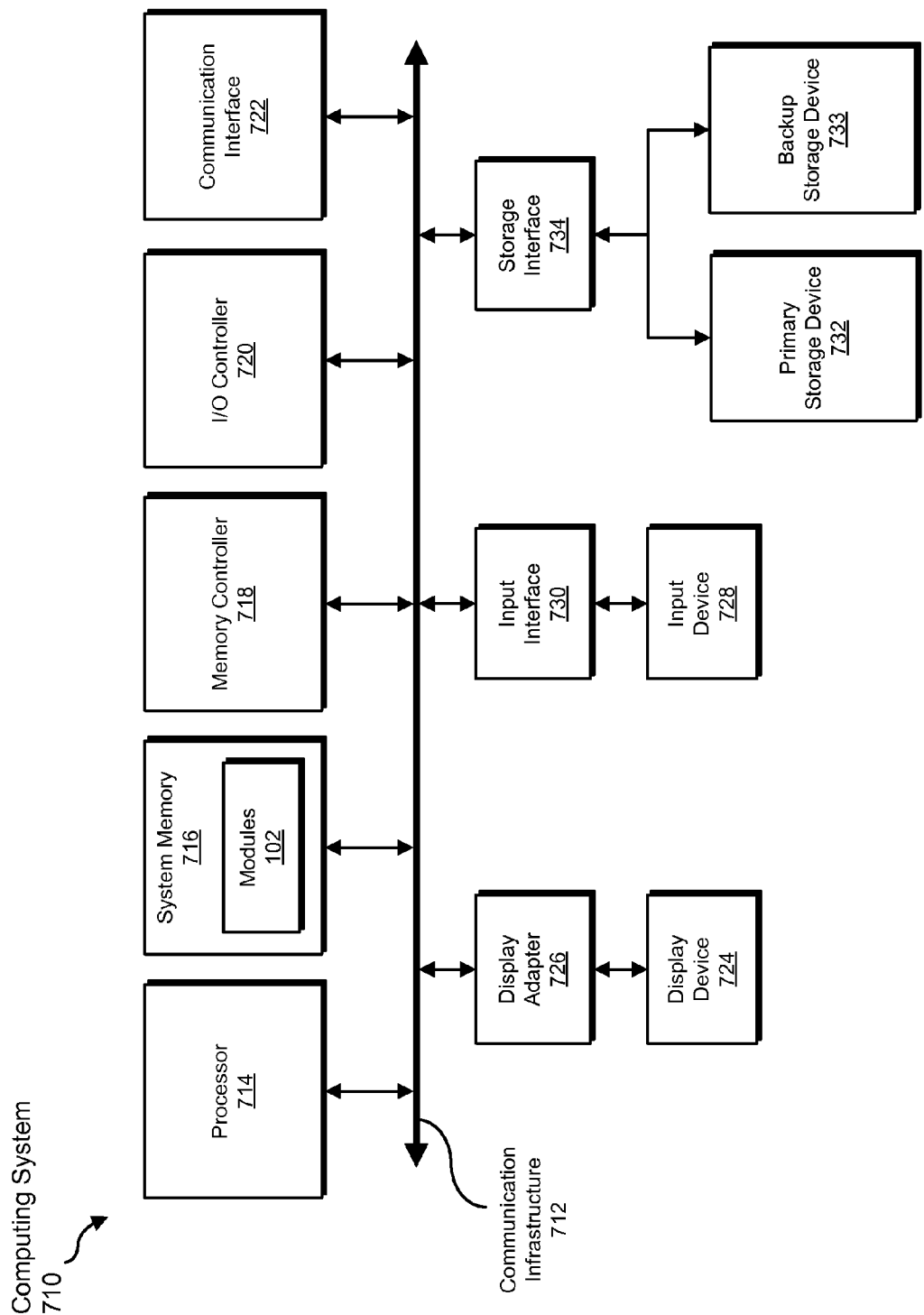
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
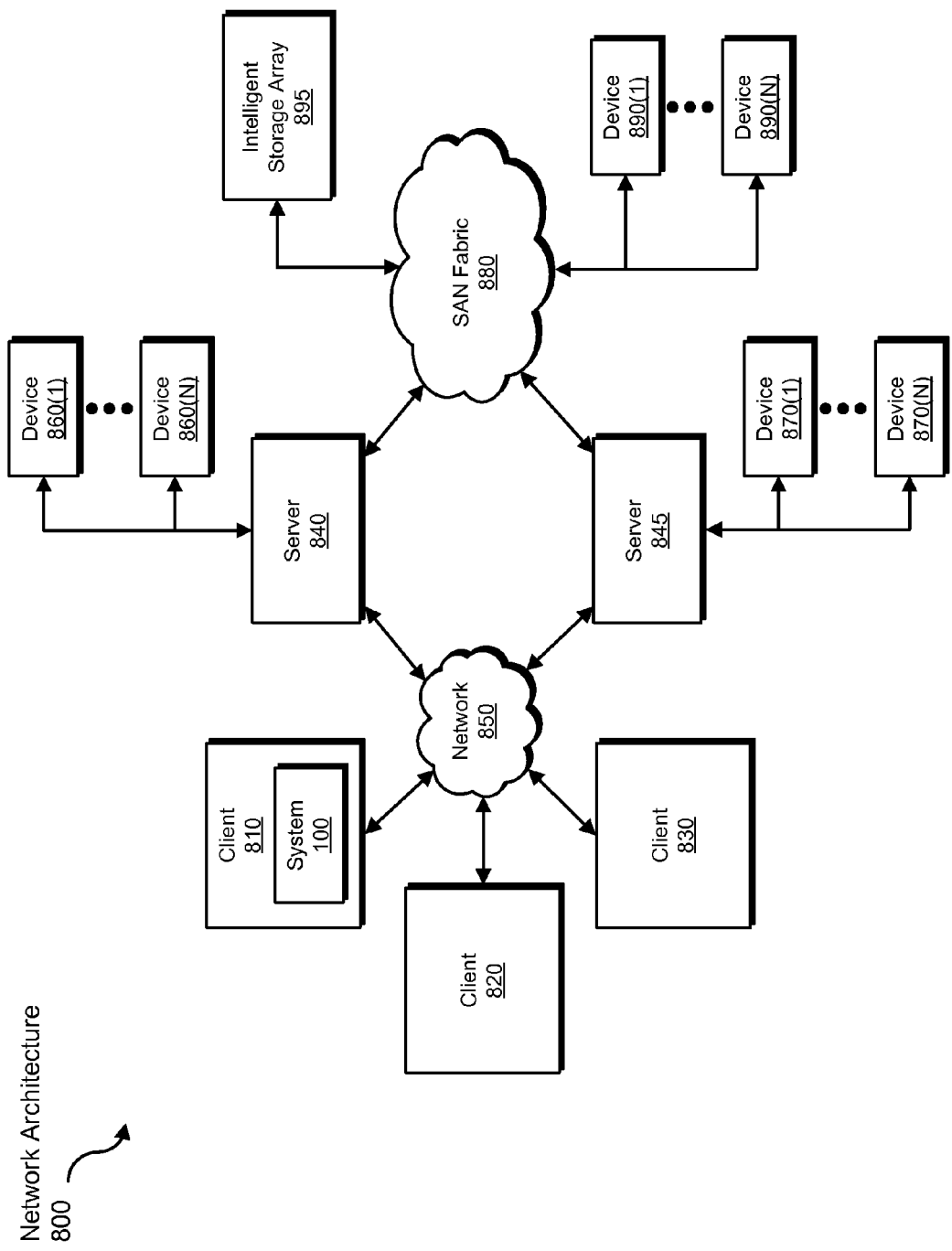
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for increasing compliance with data loss prevention policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart-watches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data loss prevention policy data to be transformed, transform the data loss prevention policy data, output a result of the transformation to a database, use the result of the transformation to display a notification, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for increasing compliance with data loss prevention policies, at least a portion of the method being performed by a computing device comprising at least one processor, the method comprising:
   identifying a file that is subject to a data loss prevention policy that comprises a set of rules that classify files according to sensitive information within the files;
   determining a classification of the file according to the data loss prevention policy;
   identifying a graphical user interface that is configured to display a representation of the file;
   enhancing the representation of the file within the graphical user interface with a visual indication of the classification of the file according to the data loss prevention policy, wherein the visual indication comprises a modification of the representation of the file.

2. The computer-implemented method of claim 1, wherein enhancing the representation of the file with the visual indication is in response to detecting an attempt to copy the file to a destination that violates the data loss prevention policy.

3. The computer-implemented method of claim 1, further comprising:
   detecting a modification of the data loss prevention policy, wherein the data loss prevention policy applies to a network;
   displaying, on at least one computing device connected to the network, a notification designed to educate users about the modification of the data loss prevention policy.

4. The computer-implemented method of claim 3, wherein the notification comprises at least one of:
   a modification to a login screen comprising information about the modification of the data loss prevention policy;
   a modification to a lock screen comprising information about the modification of the data loss prevention policy;
   a modification to a wallpaper comprising information about the modification of the data loss prevention policy;
   a popup notification comprising information about the modification of the data loss prevention policy;
   a modification to a screensaver comprising information about the modification of the data loss prevention policy.

5. The computer-implemented method of claim 3, wherein the notification is based at least in part on information provided by an administrator to be displayed to users about the modification to the data loss prevention policy.

6. The computer-implemented method of claim 1, wherein the visual indication of the classification of the file according to the data loss prevention policy comprises at least one of:
   a visual overlay on the representation of the file;
   a border around the representation of the file;
   a tinting of the representation of the file;
   a tag on the representation of the file.

7. The computer-implemented method of claim 1, further comprising:
   detecting a potential data transfer action initiated by a user;
   displaying a notification to the user that is designed to educate the user about a data loss risk caused by the potential data transfer action in response to detecting the potential data transfer action.

8. The computer-implemented method of claim 7, further comprising:
   determining that the user has previously committed a violation of the data loss prevention policy;
   determining that the violation of the data loss prevention policy was committed via a type of data transfer action that matches the type of the potential data transfer action;
   basing content within the notification to the user on the type of the potential data transfer action.

9. The computer-implemented method of claim 7, wherein displaying the notification to the user is in response to determining that the user has met a predetermined threshold for previous violations of the data loss prevention policy.

10. The computer-implemented method of claim 7, wherein at least one of:
    the potential data transfer action comprises the user opening an email application and the notification comprises a warning comprising content about a previous violation of the data loss prevention policy committed by the user via email;
    the potential data transfer action comprises the user connecting a storage device to a device that comprises sensitive data and the notification comprises a warning comprising content about a previous violation of the data loss prevention policy committed by the user via connecting a storage device to the device that comprises the sensitive data;
    the potential data transfer action comprises the user starting a file transfer session and the notification comprises a warning comprising content about a previous violation of the data loss prevention policy committed by the user via file transfer.

11. The computer-implemented method of claim 1, further comprising adding a tooltip to the modified representation of the file that displays information about the data loss prevention policy in response to a mouseover action.

12. A system for increasing compliance with data loss prevention policies, the system comprising:
- a file identification module, stored in memory, that identifies a file that is subject to a data loss prevention policy that comprises a set of rules that classify files according to sensitive information within the files;
- a determination module, stored in memory, that determines a classification of the file according to the data loss prevention policy;
- an interface identification module, stored in memory, that identifies a graphical user interface that is configured to display a representation of the file;
- an enhancement module, stored in memory, that enhances the representation of the file within the graphical user interface with a visual indication of the classification of the file according to the data loss prevention policy, wherein the visual indication comprises a modification of the representation of the file;
- at least one physical processor configured to execute the file identification module, the determination module, the interface identification module, and the enhancement module.

13. The system of claim 12, wherein the enhancement module enhances the representation of the file with the visual indication in response to detecting an attempt to copy the file to a destination that violates the data loss prevention policy.

14. The system of claim 12, further comprising:
- a detection module, stored in memory, that detects a modification of the data loss prevention policy, wherein the data loss prevention policy applies to a network;
- a display module, stored in memory, that displays, on at least one computing device connected to the network, a notification designed to educate users about the modification of the data loss prevention policy.

15. The system of claim 14, wherein the notification comprises at least one of:
- a modification to a login screen comprising information about the modification of the data loss prevention policy;
- a modification to a lock screen comprising information about the modification of the data loss prevention policy;
- a modification to a wallpaper comprising information about the modification of the data loss prevention policy;
- a popup notification comprising information about the modification of the data loss prevention policy;
- a modification to a screensaver comprising information about the modification of the data loss prevention policy.

16. The system of claim 14, wherein the notification is based at least in part on information provided by an administrator to be displayed to users about the modification to the data loss prevention policy.

17. The system of claim 12, wherein the visual indication of the classification of the file according to the data loss prevention policy comprises at least one of:
- a visual overlay on the representation of the file;
- a border around the representation of the file;
- a tinting of the representation of the file;
- a tag on the representation of the file.

18. The system of claim 12, further comprising:
- a detection module, stored in memory, that detects a potential data transfer action initiated by a user;
- a display module, stored in memory, that displays a notification to the user that is designed to educate the user about a data loss risk caused by the potential data transfer action in response to detecting the potential data transfer action.

19. The system of claim 18:
- further comprising a violation determination module, stored in memory, that determines that the user has previously committed a violation of the data loss prevention policy;
- wherein the violation determination module determines that the violation of the data loss prevention policy was committed via a type of data transfer action that matches the type of the potential data transfer action;
- wherein the display module bases content within the notification to the user on the type of the potential data transfer action.

20. A non-transitory computer-readable medium comprising one or more computer-readable instructions that, when executed by at least one processor of a computing device, cause the computing device to:
- identify a file that is subject to a data loss prevention policy that comprises a set of rules that classify files according to sensitive information within the files;
- determine a classification of the file according to the data loss prevention policy;
- identify a graphical user interface that is configured to display a representation of the file;
- enhance the representation of the file within the graphical user interface with a visual indication of the classification of the file according to the data loss prevention policy, wherein the visual indication comprises a modification of the representation of the file.

* * * * *